July 22, 1969  C. E. BOWEN  3,456,352
DRAFTING AND NAVIGATIONAL INSTRUMENTS
Filed April 15, 1968  3 Sheets-Sheet 1

INVENTOR.
CASEY E. BOWEN
BY
William G. Bobrock
ATTORNEY

INVENTOR.
CASEY E. BOWEN
BY
William C. Babcock
ATTORNEY

July 22, 1969  C. E. BOWEN  3,456,352
DRAFTING AND NAVIGATIONAL INSTRUMENTS
Filed April 15, 1968  3 Sheets-Sheet 3

INVENTOR.
CASEY E. BOWEN
BY
William G. Babcock
ATTORNEY

United States Patent Office 3,456,352
Patented July 22, 1969

3,456,352
DRAFTING AND NAVIGATIONAL INSTRUMENTS
Casey E. Bowen, 27 Sea Esta Place,
Ventura, Calif. 93003
Filed Apr. 15, 1968, Ser. No. 721,354
Int. Cl. B43l 1/12
U.S. Cl. 33—76                                                                4 Claims

ABSTRACT OF THE DISCLOSURE

A drafting instrument that is preferably provided with an illuminated surface defined by a flat sheet of light-transmitting material on which graduations are imprinted, and a protractor plate of light-transmitting material that is selectively adjustable relative thereto. The above combination is particularly adapted for drafting use when a light transmitting T square is used in conjunction therewith.

---

A major object of the present invention is to provide a drafting instrument in which a graduated protractor plate serves as a support for the paper on which one is working, with the protractor plate and paper being rotatable relative to a graduated plate and a movable T square, which protractor plate and T square are marked with appropriate graduations that are used in conjunction with those on the protractor plate to facilitate the ease with which a drafting job may be completed.

Another object of the invention is to provide a drafting instrument that is portable, and includes a rigid box which serves the three-fold purpose of providing storage space for drafting instruments and materials, an enclosure for light means used in illuminating a graduated protractor plate and a flat graduated plate associated therewith, and also as a guide for a longitudinally movable T square.

Another object of the invention is to provide a drafting instrument of relatively simple mechanical structure that can be fabricated from standard, commercially available materials, and will materially lessen the time required in completing a drafting job.

Yet another object of the invention is to supply a drafting instrument in which the graduated protractor plate carries a vernier scale that permits reading of the angulation of the protractor plate relative to a graduated plate associated therewith with a high degree of accuracy, and a minimum of inconvenience.

A still further object of the invention is to provide a drafting instrument that may be modified to incorporate a continuous roll of drawing paper, movable relative thereto, with the complete assurance that during a drafting job the paper roll will not be inadvertently creased, soiled, or torn.

Yet a further object of the invention is to supply a drafing instrument that may be modified to provide a navigational instrument by including a compass as a part of the drafting instrument, together with two spaced radio-receiving units utilized to indicate the directions in which two radio transmitting stations are situated relative the instrument, with the directions so obtained being plotted on a sheet gridded chart paper to obtain their point of intersection, that is compared with the desired line of flight to determine any deviation therefrom.

These and other objects and advantages of the invention will become apparent from the following description of several forms thereof, and from the accompanying drawings illustrating the same, in which.

Figure 1:
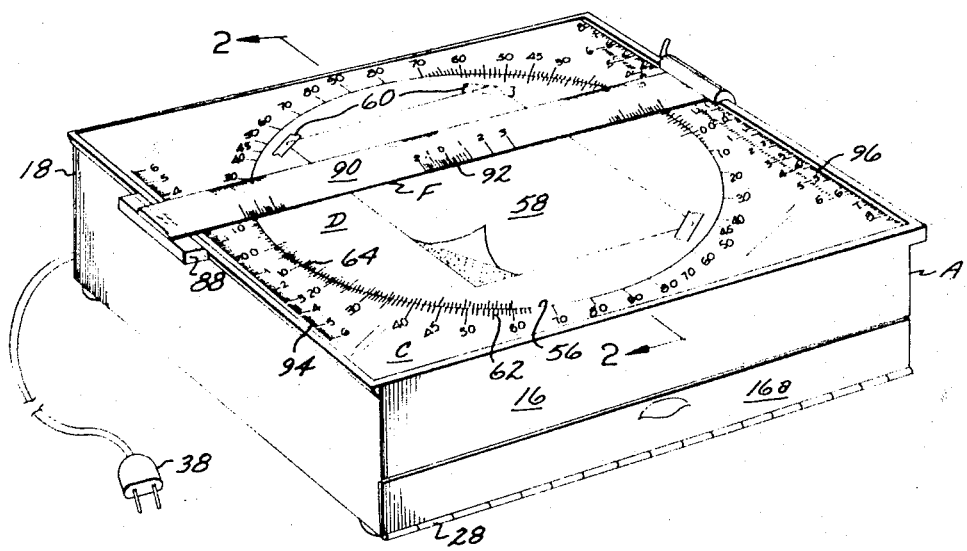
FIGURE 1 is a perspective view of the portable drafting instrument.
Figure 2:
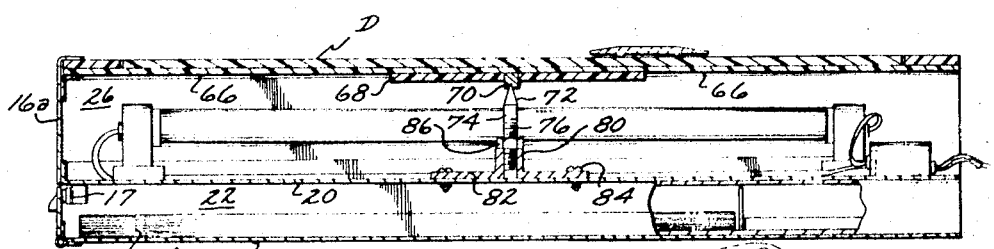
FIGURE 2 is a longitudinal cross-sectional view of the instrument, taken on line 2—2 of FIGURE 1.
Figure 3:
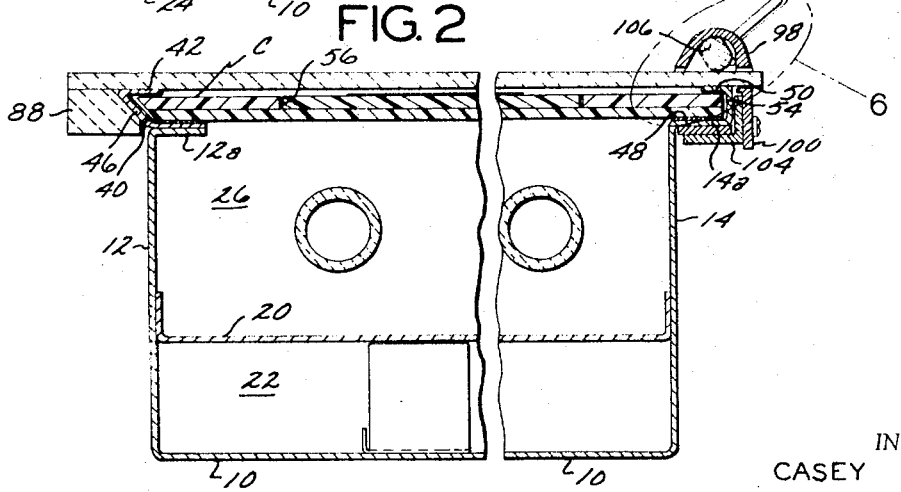
FIGURE 3 is a transverse cross-sectional view of the instrument, taken on the line 3—3 of FIGURE 1.
Figure 4:
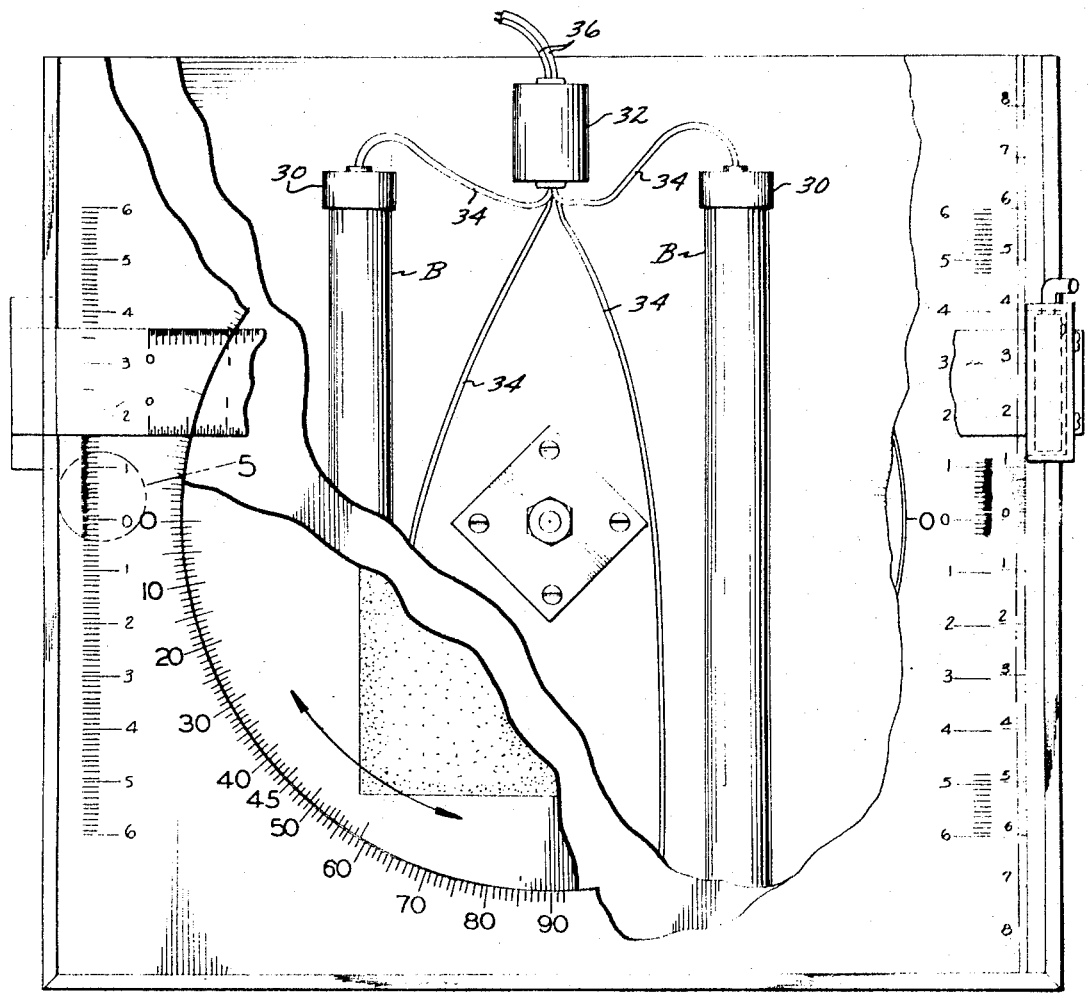
FIGURE 4 is a top plan view of the instrument shown in FIGURE 1, with portions thereof broken away to illustrate the interior thereof.
Figure 5:
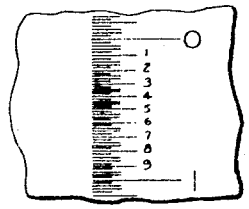
FIGURE 5 is a fragmentary enlarged top plan view of a portion of the graduations circled in phantom line in FIGURE 4.

With continuing reference to the drawings for the general arrangement of the invention, it will be seen in FIGURES 1, 2 and 3 to include a generally square box A composed of a bottom 10, first and second side walls 12 and 14, respectively, and first and second end walls 16 and 18. Box A also includes a partition 20 (FIGURE 2) situated a substantial distance above the bottom 10. Partition 20 and box A cooperatively define a lower compartment 22 in which drafting materials 24 such as paper, or the like, may be stored, and an upper compartment 26.

Access to the interior of the lower compartment 22 is attained by means of a door 16a, as shown in FIGURE 1, that is secured by hinges 28 to the edge of the bottom 10 directly below the first end wall 16. Door 16a is removably held in a closed position by conventional locking means 17. Two parallel, laterally spaced, elongate fluorescent electric bulbs B are disposed within the upper compartment 26, which are removably supported in conventional mountings 30 affixed to the upper surface of the partition 20. Partition 20 also serves to support an electric transformer 32, which by insulated conductors 34, supplies current to the two bulbs B. Two insulated electrical conductors 36 extend from transformer 32 to a conventional plug 38 that may be removably inserted in an outlet (not shown) of a domestic electrical supply system. The two bulbs B are illuminated for reasons that will later be apparent.

The first side wall 12, as best seen in FIGURE 3, is provided with a flange 12a that extends into the compartment 26. A second flange 14a extends outwardly from the second side wall 14, also shown in FIGURE 3, and flanges 12a and 14a lie in the same horizontal plane. A longitudinally extending rigid member 40 is secured to the upper surface of the flange 12a. The member 40 includes two parallel, vertically spaced first legs 42 connected by an upwardly and outwardly extending web 46. A second longitudinally extending rigid member 48 is provided having two vertically spaced second legs 50 that are connected by a vertically extending web 54. The second member 48 is secured to second flange 14a as shown in FIGURE 3.

A first rigid light-transmitting plate C is provided in which a circular opening 56 is formed, with the plate extending between the first and second elongate members 40 and 48 (FIGURE 3), as well as between the first and second end walls 16 and 18. A light-transmitting circular protractor plate D is rotatably disposed within the circular opening 56 as shown in FIGURE 1. A sheet 58 of drafting paper or other sheet material may be removably secured to the upper surface of protractor plate D by pressure sensitive tape 60, or the like. Graduations 62 in degrees are defined in plate C adjacent the opening 56. Protractor plate D includes vernier graduations 64 to assist in reading the angulation of the plate D relative to the plate C with the greatest possible accuracy.

A second rigid plate of light-transmitting material 66 underlies the first plate C and protractor plate D, and extends between the first and second end walls 16 and 18, as well as between the side walls 12 and 14. A third sheet of rigid light-transmitting material 68 is secured to the central under portion of the second plate 66, with the third plate having a bearing 70 situated at the center thereof. Bearing 70 is engaged by the pointed end 72 of a rotatable rigid rod 74 on the lower exterior portion of which threads 76 are formed. Threads 76 engage a tapped boss 80 which extends upwardly from a base 82 that is secured to the upper surface of the partition 20 by screws 84, or other suitable fastening means. The threads 76 are engaged by a lock nut 86 that can be rotated into binding engagement with the boss 80 to hold the rod 74 at such an elevation relative to the base 82 that the third plate 68, second plate 66 and protractor plate D are disposed in parallel relationship with the bottom 10.

Figure 6:
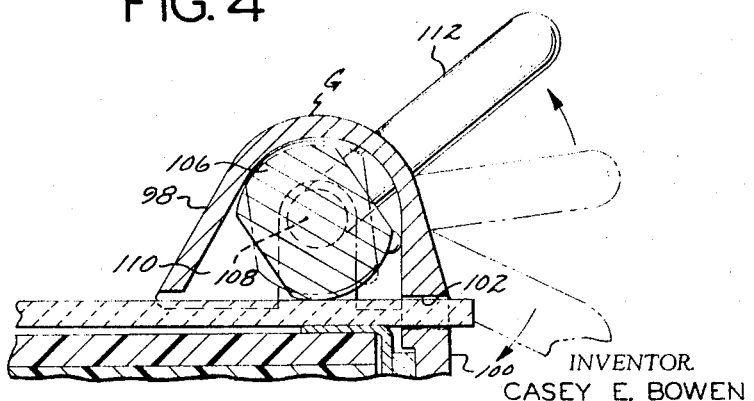
FIGURE 6 is an enlarged cross-sectional view of the T square clamp encircled in phantom line in FIGURE 3.

The invention also includes a T square F formed from a light-transmitting material. T square F includes a head 88 that slidably engages the exterior surface of the web 46, as best seen in FIGURE 3, and an elongate rigid member 90 which extends transversely across the upper portion of the box A and projects outwardly beyond the second elongate member 48. Graduations 92 extend longitudinally along T square F and graduations 94 and 96 are formed along the longitudinal sides of the first plate C, as illustrated in FIGURE 1. The graduations 94 and 96 are used to obtain a desired positioning of the T square F on the box A, or the distance the T square F has been moved relative to the first plate C and protractor plate D. The T square F may be removably held in a desired position on the box A, as shown in FIGURE 1, by use of the holder G, best seen in FIGURES 1, 3 and 6, which is the subject of my Patent No. 2,995,823, entitled "T Square Holder," granted Oct. 15, 1961.

The holder G as described in detail in said prior patent, includes a concave shell 98 from which a flange 100 extends downwardly, and in which flange an opening 102 is formed through which an end portion of the T square member 90 projects. The flange 100 adjustably supports an L-shaped guide 104 that slidably engages the lowermost of the second legs 50 as shown in FIGURE 3.

An elongate rigid body 106 of non-circular transverse cross-section is rotatably supported within the confines of the shell 98 on stub shafts 108 that are journalled in end pieces 110 affixed to the shell. When the elongate body 106 is pivoted from the position shown in solid line to that shown in phantom line in FIGURE 6, the T square member 90 is gripped by the member 106 and held in a fixed transversely extending position on the box A. Pivotal movement of the member 106 is attained by use of a handle 112 secured thereto, and which extends through a vertical slot (not shown) formed in the shell 98. The handle 112 may be pivoted from the position shown in solid line in FIGURE 6 to that shown in phantom line in the same figure. When handle 112 has been moved to the lowermost position shown in phantom line in FIGURE 6, the elongate body 106 is in maximum pressure contact with the upper surface of the T square member 90.

Use and operation of the form of the invention described above are relatively simple. A sheet of drawing material 58 is secured to the upper surface of the protractor plate D (FIGURE 1). The T square F is mounted on the upper portion of the box A and is slidable therealong. When it is desired to lock the T square F in a fixed position on box A for drafting purposes, the holder G previously described, is employed. Protractor plate D can, of course, be rotated relative to the first plate C, and lines of any desired angulation (not shown) drawn on the sheet 58 by use thereof. By manipulation of the handle 112, the T square F may be intermittently moved to desired positions on the box A, and after each position is reached, locked in place relative to box A. The graduations 94 and 96 on each side of the first plate C permit movement of the T square F from one position to another with a high degree of accuracy.

Prior to use of the invention, the plug 38 is inserted into a domestic electrical outlet (not shown) whereby the bulbs B emit a relatively small amount of heat during operation, but discharge sufficient light to illuminate the first plate C, protractor plate D, and the T square F, all of which are preferably formed from a clear, light-transmitting plastic material. Adjustment of the protractor plate D and plate C to positions where they lie in a common plane parallel to the partition 20, is achieved by use of the rod 74. The lock nut 86 is first loosened, and the threaded rod then rotated in the boss 80 to move the pointed portion 72 of rod 74 either upwardly or downwardly to place the second and third plates and the protractor plate in desired positions relative to the partition 20.

Figure 7:
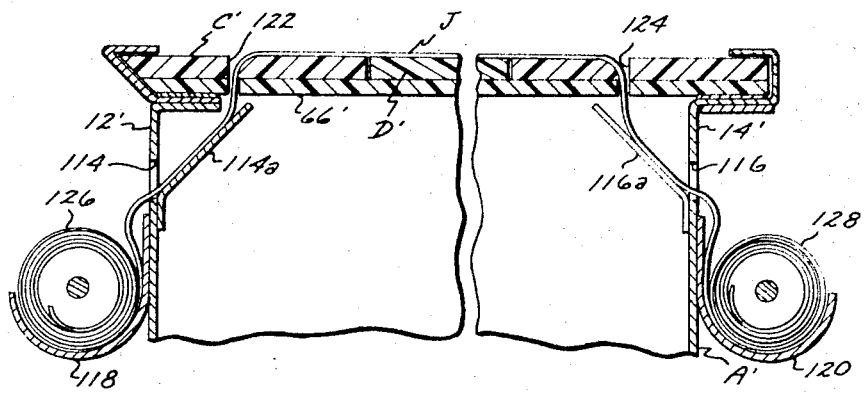
FIGURE 7 is a transverse cross-sectional view of a first modified form of the drafting instrument.

A first alternate form of the invention is shown in FIGURE 7, which may be identical to that form thereof shown in FIGURES 1 to 6 inclusive, other than that openings 114 and 116 are formed in the side walls 12' and 14' of the box A'. All elements comprising the form of the invention shown in FIGURE 7 which are common to the form of the invention shown in FIGURES 1 to 6 inclusive, are identified by the same numerals, but to which a prime has been added.

Two guides 114a and 116a extend upwardly and inwardly from the interior surfaces of the side walls 12' and 14'. Two parallel, semi-cylindrical shells 118 and 120 are mounted on the exterior surfaces of the side walls 12' and 14', respectively, situated below the openings 114 and 116. Two laterally spaced, vertically aligned openings 122 and 124 are formed in plates C' and 66', through which the sheet of drafting material J extends. The sheet J passes through the openings 122 and 124, as well as openings 114 and 116, to rolls 126 and 128 respectively, which are supported in the shells 118 and 120. The sheet of drafting material J resting on portions of the plate C' and the protractor plate D' is positioned for use, with the excess paper being disposed in either roll 126 or 128. The excess drafting material J is so disposed that it will not inadvertently be damaged during work thereon.

Figure 8:
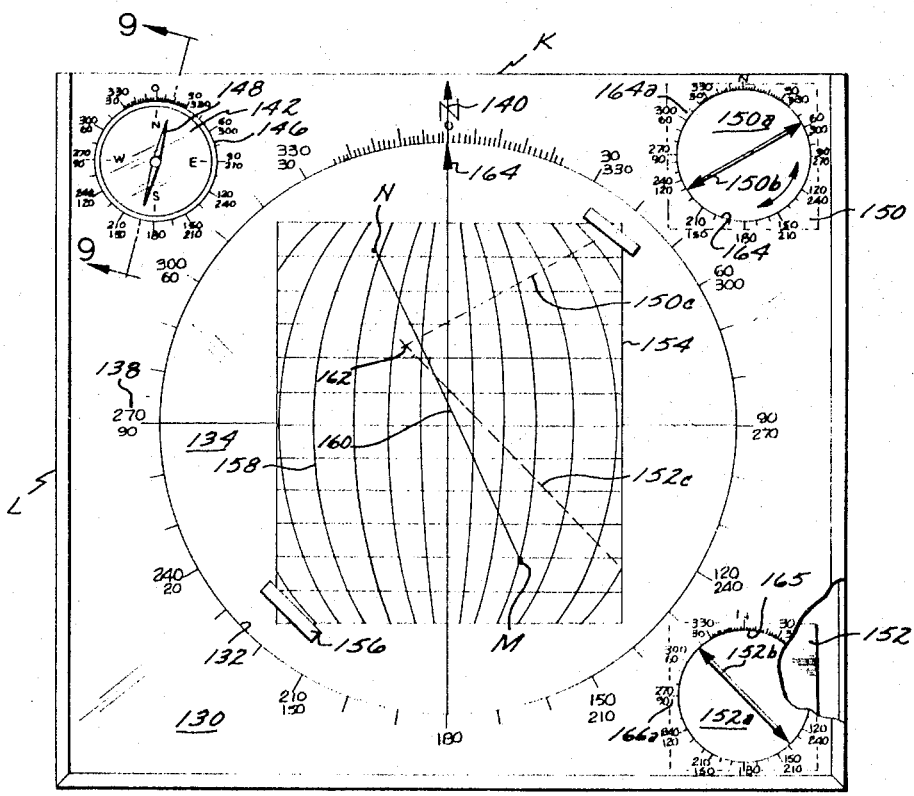
FIGURE 8 is a top plan view of the drafting instrument modified to serve as a navigational instrument.
Figure 9:
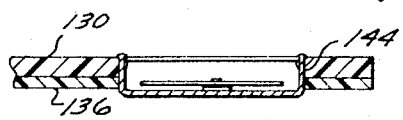
FIGURE 9 is a fragmentary vertical cross-sectional view of the device shown in FIGURE 8, taken on the line 9—9 thereof.

A navigational instrument K is shown in FIGURES 8 and 9, which includes a box L of the same general structure of box A previously described. A rigid plate 130 extends across the top of box L and a circular opening 132 is formed therein in which a circular plate 134 is positioned. A second plate 136 extends under plate 130, and rotatably supports the circular plate 134 within the confines of opening 132 in the same manner as the protractor plate D is rotatably supported relative to the plate C in that form of the invention shown in FIGURES 1 to 6.

Graduations 138 are imprinted on plate 130 adjacent the opening 132, and as shown in FIGURE 8, a north arrow 140 is also imprinted thereon. A compass 142 of conventional design, is provided, which is supported in an opening 144 formed in both plates 130 and 136, as may be seen in FIGURE 9. Graduations 146 are imprinted on plate 130 adjacent the opening 144. The compass, of course, includes a pivotally supported, magnetized needle 148, which indicated the magnetic north.

Two radio-receiving units 150 and 152 are located in the corner portions of the box L, as may be seen in FIGURE 8, and rotatable dials 150a and 152a are mounted thereon, which dials carry arrows 150b and 152b. The radios are of a type that emit the strongest signal when the dials 150a and 152a are so oriented relative to two radio stations (not shown) that the arrows 150b and 152b point to the stations. The circular plate 134 is adapted to have a sheet of a map 154 adhered to the upper surface thereof by tape 156, or the like. Grids 158 are shown on map 154, as well as the terrain over which a flight is to be made. As an illustration, the instrument K is shown as being used on a flight which originated at a point M and terminated at a point N, both of which points are located on map 154. A line 160 is drawn between the two locations M and N. The instrument is used to determine the user's location along a flight path between two points, and to assist in this determination two radios 150 and 152 are employed in conjunction therewith. The two stations at each point are tuned in by rotation of the dials 150a and 152a of radios 150 and 152 respectively, until maximum signal strength is received from each station, at which time the arrows 150b and 152b are oriented in the manner shown in FIGURE 8. With a straight edge ruler, or the like, lines 150c and 152c may then be drawn on map 154, which are in fact, extensions of the arrows 150b and 152b. The point of intersection 162 of the two lines 150c and 152c on map 154, indicates the actual position of the user of the instrument, and also indicates the extent he may be off course from the intended line of flight 160.

Manipulation of the circular plate 134 will bring the pointer 164 thereof into an appropriate position relative to the graduations 138, whereby the correction necessary to bring a plane back onto the proper flight line 160 may be easily and quickly determined. The dials 150a and 152b of radios 150 and 152 respectively, are disposed in openings 165 and 166 formed in the plates 130 and 136. The bodies of the radios 150 and 152 are situated below plates 130 and 136, within the confines of the box L. Graduations 165a and 166a are formed on the plate 130 adjacent the openings 165 and 166, as shown in FIGURE 8.

The use and operation of the form K of the invention have been described previously in detail and need not be repeated.

It will be particularly noted in the operation of the device that the downwardly and inwardly tapering web 46 so slidably engages the head 88 as to prevent the T square F being inadvertently displaced from box A.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. A drafting instrument, including:
 (a) a box comprising a bottom, first and second side walls, and first and second end walls, which walls extend upwardly from said bottom;
 (b) a partition situated in said box that is parallel to said bottom and disposed thereabove, which partition divides said box into an upper compartment and a lower compartment;
 (c) lighting means disposed in said upper compartment and supported on said partitions;
 (d) door means in said box to permit access to said lower compartment for storage of drafting materials therein and removal therefrom;
 (e) first and second flanges parallel to said bottom supported on the upper ends of said first and second side walls, with said first flange extending into said upper compartment and said second flange extending outwardly from said second side wall supporting the same;
 (f) an elongate member of U-shaped transverse cross section affixed to the upper end of said first flange, which member comprises two first vertically spaced parallel legs, and a first web connecting the same that extends outwardly and upwardly from said first side wall;
 (g) a second elongate member of channel-shaped cross section mounted on said second flange, which member comprises two second parallel legs extending inwardly towards said first legs and a vertically extending second web;
 (h) a T square fabricated from a light-transmitting material comprising a head that slidably engages said first web and an elongate cross piece that extends transversely across said box and projects outwardly beyond said second flange;
 (i) manually operable means for holding said T square in a desired longitudinal position on said box;
 (j) a first plate of light-transmitting material that extends transversely between said first and second elongate members, as well as between said first and second end walls, in which first plate a circular opening is formed and around which graduations are defined;
 (k) a protractor plate formed of a light-transmitting material, on the peripheral portion of which a plurality of graduations are imprinted to indicate the degree that said protractor plate has been rotated relative to said first plate, which protractor plate is disposed within the confines of said opening;
 (l) a second rigid light-transmitting plate that extends between said end walls and under said first plate and protractor plate for rotatably supporting the latter;
 (m) a third plate of light-transmitting material and smaller diameter than said protractor plate positioned under the central portion of said second plate;
 (n) a bearing that projects downwardly from the central portion of said third plate;
 (o) vertically adjustable means supported on said partition that engage said bearing for adjusting said second and third plates to positions substantially parallel with said partition; and
 (p) graduated means defined on the outer longitudinal edge portions of said first plate which visually indicate the distance said T square has been moved longitudinally relative to said box.
2. A drafting instrument as defined in claim 1 wherein said lighting means includes:
 (q) a transformer disposed in said box;
 (r) means for supplying electrical energy to said transformer;
 (s) at least one elongate fluorescent electric tube disposed in said upper compartment;
 (t) means for supporting said tube in said upper compartment parallel to said partition; and
 (u) means for supplying electric energy from said transformer to said tube.
3. A drafting instrument as defined in claim 1 wherein said graduations on said protractor plate comprise a vernier scale.
4. A drafting instrument as defined in claim 2 which further includes:
 (q) two parallel, transversely aligned, semi-cylindrical shells affixed to the exterior surfaces of said first and second side walls below openings formed therein;
 (r) two upwardly and inwardly extending guides affixed to the interior surfaces of said first and second side walls below said openings formed therein, with said shells being capable of movably supporting two connected rolls of drafting material, which drafting material between said rolls extends through said openings and along said guides to openings formed in said first and second plates on opposite sides of said protractor plate, with at least a portion of said paper being at all times disposed above said protractor plate.

References Cited

UNITED STATES PATENTS

| Re. 24,927 | 1/1961 | Shelly | 33—78 X |
| 2,942,347 | 6/1960 | Kuhn | 33—78 |
| 2,995,823 | 8/1961 | Bowen | 33—80 |
| 3,032,917 | 5/1962 | Shine | 108—23 |

HARRY N. HAROIAN, Primary Examiner

U.S. Cl. X.R.

33—1; 108—23